United States Patent Office 3,450,992
Patented June 17, 1969

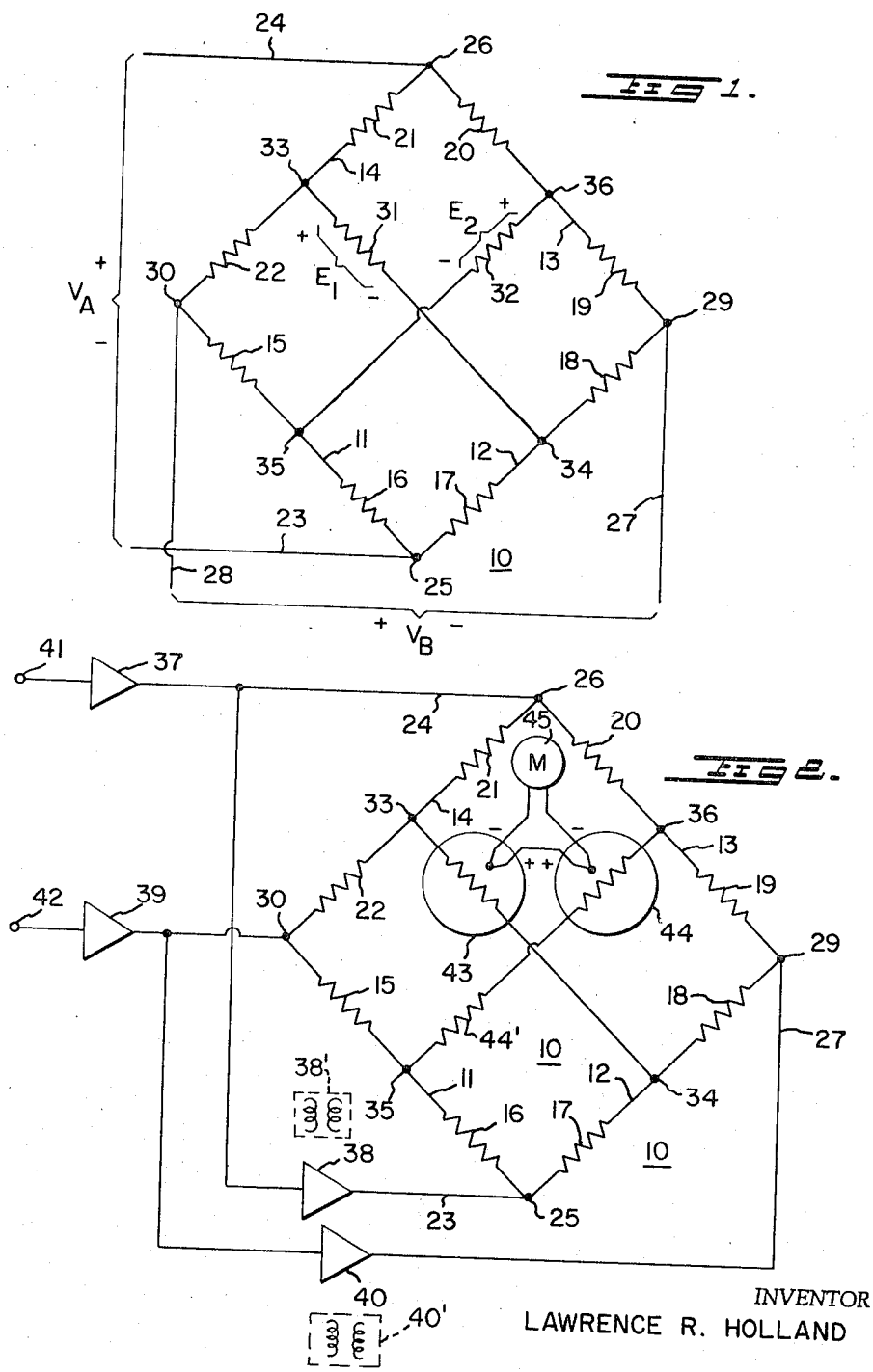

3,450,992
PRODUCT-TYPE PHASE SENSITIVE DETECTOR INCLUDING A BALANCED IMPEDANCE BRIDGE HAVING THERMOCOUPLE LOAD ELEMENTS CONNECTED ACROSS OPPOSITE BRIDGE ARMS
Lawrence R. Holland, Philadelphia, Pa., assignor to Research Corporation, New York, N.Y., a nonprofit corporation of New York
Filed Apr. 27, 1966, Ser. No. 545,724
Int. Cl. G01r 5/26
U.S. Cl. 324—106                    7 Claims

ABSTRACT OF THE DISCLOSURE

A product-type phase sensitive detector having common mode rejection and a flat frequency response is provided wherein balanced output signals proportional to the square of the sum and the difference of applied input signals are taken across separate load means having a square law response and being connected across intermediate points of a balanced four-arm impedance bridge.

---

Bridge circuits are well-known for use in phase measurement of applied input signals, and one example of a known bridge arrangement is described in U.S. Patent 2,169,116. In this patent there is described and illustrated a well known four-arm bridge which in conjunction with a pair of thermocouples and meter may be utilized to indicate the average value of the product of two input signals. The input signals are applied to two pairs of terminals, one of which is balanced, the other single ended. If the resistances of the bridge are equal, then one half the vector sum of the signals will appear across one thermocouple heater, while half the vector difference is applied to the other thermocouple heater. A meter is so connected as to read the sum of the output of the thermocouples, which will be proportional to the product of the input signals.

This bridge suffers from the disadvantage that it cannot distinguish between a common mode signal on the balanced input and a signal on the unbalanced input. Therefore, common mode signals on the balanced input will lead to spurious readings. Furthermore, the signal applied to the single ended input will appear in common mode on the balanced input terminals which may lead to an undesirable coupling of the two sources. Finally, neither thermocouple has a balanced input and so some fraction of both of the input signals will appear in common mode at the thermocouple outputs. At high frequencies, the unavoidable capacity between the thermocouples and their heaters is sure to degrade the operation of the instrument, which is therefore limited to power transmission frequencies. Any effort to overcome this limitation would be expensive, complicated, and sensitive to maladjustment.

By the present invention, these and other disadvantages of known arrangements are overcome and there is provided an improved product-type phase sensitive detector having a high degree of common mode rejection at both inputs, which are balanced. To this end, there is provided a novel impedance bridge wherein the outputs are proportional to the sum and difference of two applied balanced input signals. Such a bridge circuit may be advantageously utilized in a number of applications such as, for example, synchronous detectors, FM multiplex stereosonic broadcasting and the like, and together with a pair of vacuum thermocouples or other square law devices provides an efficient and economical means for extracting a signal from overwhelming noise.

Accordingly, one object of the present invention is to provide a novel impedance bridge wherein both the applied inputs and the outputs are in balance or in push-pull configuration.

Another object of the present invention is to provide a novel impedance bridge for producing the sum and difference of two applied balanced input signals.

A further object of the present invention is to provide a product-type phase sensitive detector having a narrow band width and high noise rejection.

Still another object of the present invention is to provide an improved product-type phase sensitive detector having a flat frequency response.

Another object of the present invention is to provide an improved product-type phase sensitive detector which is highly efficient in operation and simple and economical in construction.

These and other objects of the present invention and the attendant advantages will be apparent from the following detailed description of the structure and mode of operation thereof.

In carrying out the present invention, in one illustrative embodiment thereof, there is provided a four-arm impedance bridge having two pairs of opposed terminals to which are applied balanced input signals. Balanced output signals proportional to the sum and difference of the applied input signals are taken across separate load means connected between intermediate points of opposed bridge arms. Advantageously, if the impedance of each arm is made equal and with identical loads, the resulting symmetry prevents any coupling between the signal sources and places the center of each load at signal ground.

In accordance with another illustrative embodiment of the present invention, the separate load means utilized have a square law response, and the outputs of the bridge are proportional to the square of the sum and of the difference of the applied input signals.

In accordance with still another feature of the present invention, the separate load means utilized have a square law response and the outputs of the bridge are arranged to be subtracted to provide a product output proportional to the product of the applied input signals.

While the specification concludes with claims particularly pointing out and distinctly claiming the subject matter of the present invention, it is believed the invention will be more readily understood by reference to the following detailed description taken in connection with the accompanying drawing, and although only one specific form of the invention is illustrated, it is to be expressly understood that this drawing is for the purpose of illustration only and is not intended to represent the full scope of the invention which is defined by the appended claims.

In the drawing, wherein like reference characters indicate like parts throughout the several views;

FIG. 1 is a schematic diagram of the impedance bridge circuit embodying the present invention; and FIG. 2 is a schematic diagram of a product-type phase sensitive detector incorporating the impedance bridge of FIG. 1, and with the input amplifiers illustrated in block form.

Referring to the drawing, and particularly to FIG. 1, reference character 10 designates generally an impedance bridge arranged to provide the sum and difference of two applied balanced input signals. To this end, bridge 10 comprises four impedance arms 11–14, each of which includes a pair of serially connected impedance elements. Preferably, each of the impedance elements is of equal value and of the same type, i.e., either resistive or reactive. Arm 11 includes impedance elements 15 and 16; arm 12 includes impedance elements 17 and 18; arm 13 includes impedance elements 19 and 20; and arm 14 includes impedance elements 21 and 22.

One balanced input signal, designated by reference character $V_A$, is applied via input conductors 23 and 24 to the diagonally opposed terminals 25 and 26 of the bridge formed at the junctions of arms 11–12 and 13–14, respectively. The other balanced input signal, designated by reference character $V_B$, is applied via input conductors 27 and 28 to the other pair of diagonally opposed terminals 29 and 30 formed at the junctions of arms 12–13 and 14–11, respectively, of the bridge.

The outputs of bridge 10 corresponding to the sum and difference of the applied signals are taken across load impedance 31 and 32 and are designated by reference characters $E_1$ and $E_2$, respectively. Load impedance 31 is connected to intermediate points 34 and 33 of the opposed bridge arms 12 and 14 formed by the junction of impedances 17–18 and 21–22, respectively. Load impedance 32 is connected to intermediate points 35 and 36 of the opposed bridge arms 11 and 13 formed by the junction of impedances 15–16 and 19–20, respectively.

It can be readily appreciated that the impedance bridge 10 is advantageously adapted for a variety of applications where it is desired to obtain the sum and difference of two applied signals. For example, in standard FM multiplex stereosonic broadcasting, the information from the FM tuner comes as two audio signals, one representing the sum of the right and left audio signals, the other the difference, and these must be separated into right and left channels. The spilt-bridge 10 of the present invention accomplishes this efficiently and with a minimum of components. Advantageously, if the impedances of the bridge arms are resistive, there is provided a flat frequency response from DC to RF frequencies. However, if a flat frequency response characteristic is not absolutely essential, other impedance elements can be utilized such as, for example, capacitors.

Referring to FIG. 2, impedance bridge 10 is arranged in circuit to provide a product-type phase sensitive detector of long integration time. The impedance bridge 10 is driven by four conventional operational DC amplifiers 37–40 each having a gain of −1 and arranged to provide a balanced input to the input terminals. To this end, one input signal from terminal 41 is translated through amplifier 37 which has its output connected via input conductor 24 to bridge terminal 26. The output of amplifier 37 is also translated through an inverting amplifier 38 which has its output connected via conductor 23 to bridge terminal 25.

Another input signal from terminal 42, which may be a reference signal, is similarly applied through input amplifier 39 and inverting amplifier 40 to bridge terminals 30 and 29. Advantageously, the input amplifiers are cut off at 100 kc. so that the inverting amplifiers cannot shift the phase of any signal that can reach them. Also the output of each amplifier may be clipped at such a voltage, positive and negative, as to prevent damage to the load impedances which may be current responsive devices.

In the preferred embodiment of the product-type phase sensitive detector of the present invention, the output load impedances comprise a pair of matched vacuum thermocouples 43 and 44, which correspond to the load means 31 and 32, respectively, of FIG. 1. The thermocouples 43 and 44 have a square law response and are arranged to form a "quarter square" multiplier. To this end, the heater of thermocouple 43 is connected across the intermediate points 33 and 34 of the two opposed arms 14 and 12 of bridge 10, while the heater of thermocouple 44 is connected across the intermediate points 35 and 36 of the other two opposed arms 11 and 13 of the bridge. If desired, a balance resistor 44 may be connected in series with the heater of one of the thermocouples to allow for differences in characteristics.

The outputs of the thermocouples may be conveniently read by a suitable indicator 45 such as, for example, a D'Arsonval meter connected in series with the thermocouples.

Since the ouptut of each thermocouple is proportional to heat or power and has a square law response, the output voltage generated by thermocouple 43 is proportional to the square of the sum of the applied balanced input signals. Likewise, the output voltage generated by the thermocouple 44 is proportional to the square of the difference of the applied balanced input signals. By connecting the thermocouples series opposing, the outputs of the thermocouples are subtracted and the resultant output voltage applied to the indicator is proportional to the product of the applied balanced input signals.

The thermocouple elements are connected in series opposing, with the polarity as shown, such that the outputs of the thermocouples, one of which is proportional to the square of the sum of the input signals and the other of which is proportional to the square of the difference of the input signals, are subtracted. Since the outputs generated by the thermocouples are proportional to:

$$V_A^2 + 2V_AV_B + V_B^2 \qquad (1)$$
$$V_A^2 - 2V_AV_B + V_B^2 \qquad (2)$$

the resultant product output after the outputs of the thermocouples are subtracted is proportional to four times the product of the input signals, or:

$$4V_AV_B \qquad (3)$$

The net effect is that only in-phase signal components in $V_A$ and $V_B$ produce a net positive output in the meter 45 connected in series with the thermocouples. Because the thermocouples have an inherently slow response, only signal components which remain in phase will produce a meter deflection. Accordingly, the phase sensitive detector provides a rejection of all but those signals which appear in both inputs and which maintain a constant in-phase relationship. The product-type phase sensitive detector integrates the product of the incoming signals and the integral is non-zero if both signals contain a common Fourier component.

Under ideal conditions, thermocouples 43 and 44 are selected from a matched pair of insulated vacuum thermocouples to avoid problems of dissymmetry. Perfect matching, however, is not absolutely necessary, and variations can be compensated for by balance resistor 44'.

With each of the bridge impedance elements being equal and with balanced inputs being applied to the bridge, the center of each vacuum thermocouple is maintained at signal ground. The resulting symmetry prevents any coupling between the signal sources. Since both of the input signals are in balance, or push-pull configuration, as are both of the output signals, a high degree of common mode rejection is provided which eliminates input strays such as, for example, stray signals which otherwise might be present in the sheath of a coaxial input cable.

Although a particular form of the invention has been described, it will be readily apparent to those skilled in the art that various modifications may be made without departing from the inventive concept. For example, where a DC response is not needed and very flat frequency response is also unnecessary, a pair of input transformers as illustrated in the blocks 38' and 40' outlined by dash lines adjacent the corresponding inverting amplifiers 38 and 40 can be substituted for the inverting amplifiers to provide the balanced input signals. This arrangement results in a considerable saving in cost. Also, the indicator used to read out the product of the two input signals may be replaced by an amplifier and load which is to be controlled, such as, for example, an aircraft control surface which is required to respond to the product of two command signals, e.g., a gyro reference and an enabling signal from an acceleration limiting safety device. It is therefore intended by the appended claims to cover all such modifications which come within the true spirit and scope of the invention.

What is claimed is:
1. A product-type detector comprising a four-arm impedance bridge having two pairs of opposed terminals, means for applying a first balanced input signal to one of said pairs of terminals, means for applying a second balanced input signal to the other of said pairs of terminals, first load means having a square law response and being connected across intermediate points of each of two opposed bridge arms for providing an output proportional to the square of the sum of said first and said second input signals and second load means having a square law response and being connected across intermediate points of each of the other two opposed bridge arms for providing an output proportional to the square of the difference of said first and said second input signals, means connecting the outputs of said first and said second load means in series opposing relationship for providing an output proportional to the product of the applied input signals.

2. A product-type detector as set forth in claim 1 wherein each of said first and said second load means is a thermocouple element having a square law response, each having its heater element connected across intermediate points of an opposed pair of bridge arms to provide outputs proportional to the square of the sum and the square of the difference of the applied input signals.

3. A product-type detector as set forth in claim 2 wherein the output of said thermocouples are connected in series opposing relationship to provide an output proportional to the product of the applied input signals and further including an indicator serially connected to said thermocouples and responsive to said last named output.

4. A product-type detector as set forth in claim 1 wherein said means for applying a first balanced input signal includes first amplifying means connected to an input terminal and being adapted to receive a first input signal and having its output connected to said one of said pairs of terminals and second amplifying means connected to a second input terminal and being adapted to receive a second input signal and having its output connected to said other of said pairs of terminals, said first and said second load means being connected in series opposing relationship to provide an output proportional to the product of the applied balanced input signals and further including an indicator serially connected to said load means and responsive to said last named output.

5. A product-type detector as set forth in claim 4 wherein said first amplifying means comprises a first input amplifier and a first inverting amplifier, said first input amplifier having its input connected to said first input terminal and its output connected to one terminal of said one of said pairs of terminals and to the input of said first inverting amplifier, the output of said first inverting amplifier being connected to the other terminal of said one of said pairs of terminals, said second amplifying means comprising a second input amplifier and a second inverting amplifier, said second input amplifier having its input connected to said second input terminal and its output connected to one terminal of said other of said pairs of terminals and to the input of said second inverting amplifier, the output of said second inverting amplifier being connected to the other terminal of said other of said pairs of terminals.

6. A product-type detector as set forth in claim 1 further including first transformer means having its input connected to an input terminal adapted to receive a first input signal and having its output connected to said one of said pairs of terminals for supplying thereto said first balanced input signal and second transformer means having its input connected to a second input terminal adapted to receive a second input signal and having its output connected to said other of said pair of terminals for supplying thereto said second balanced input signals.

7. A product-type detector as set forth in claim 4 wherein said first amplifying means comprises a first input amplifier and a first transformer, said first input amplifier having its input connected to said first input terminal and its output connected to the input of said first transformer, the output of said first transformer being connected to said one said pairs of terminals for supplying thereto said balanced input signal and said second amplifying means comprises a second input amplifier and a second transformer, said second input amplifier having its input connected to said second input terminal and its output connected to the input of said second transformer, the output of said second transformer being connected to said other of said pairs of terminals for supplying thereto said second balanced input signal.

References Cited

UNITED STATES PATENTS

| | | | |
|---|---|---|---|
| 2,169,116 | 8/1939 | Thompson | 324—106 |
| 2,316,153 | 4/1943 | Brown. | |
| 2,644,923 | 7/1953 | Gregg | 324—106 |
| 2,935,260 | 5/1960 | Philbrick et al. | 235—194 |
| 3,017,107 | 1/1962 | Moxley | 235—194 |
| 3,019,983 | 2/1962 | Philbrick | 235—194 |
| 3,021,074 | 2/1962 | Groenendyke | 235—194 |
| 3,358,231 | 12/1967 | Baganoff | 324—142 XR |

RUDOLPH V. ROLINEC, *Primary Examiner.*

G. R. STRECKER, *Assistant Examiner.*

U.S. Cl. X.R.
235—194; 324—140